F. G. BREYER, P. R. CROLL, AND C. W. FARBER.
MANUFACTURE OF LITHOPONE.
APPLICATION FILED OCT. 2, 1919.
1,411,645.  Patented Apr. 4, 1922.
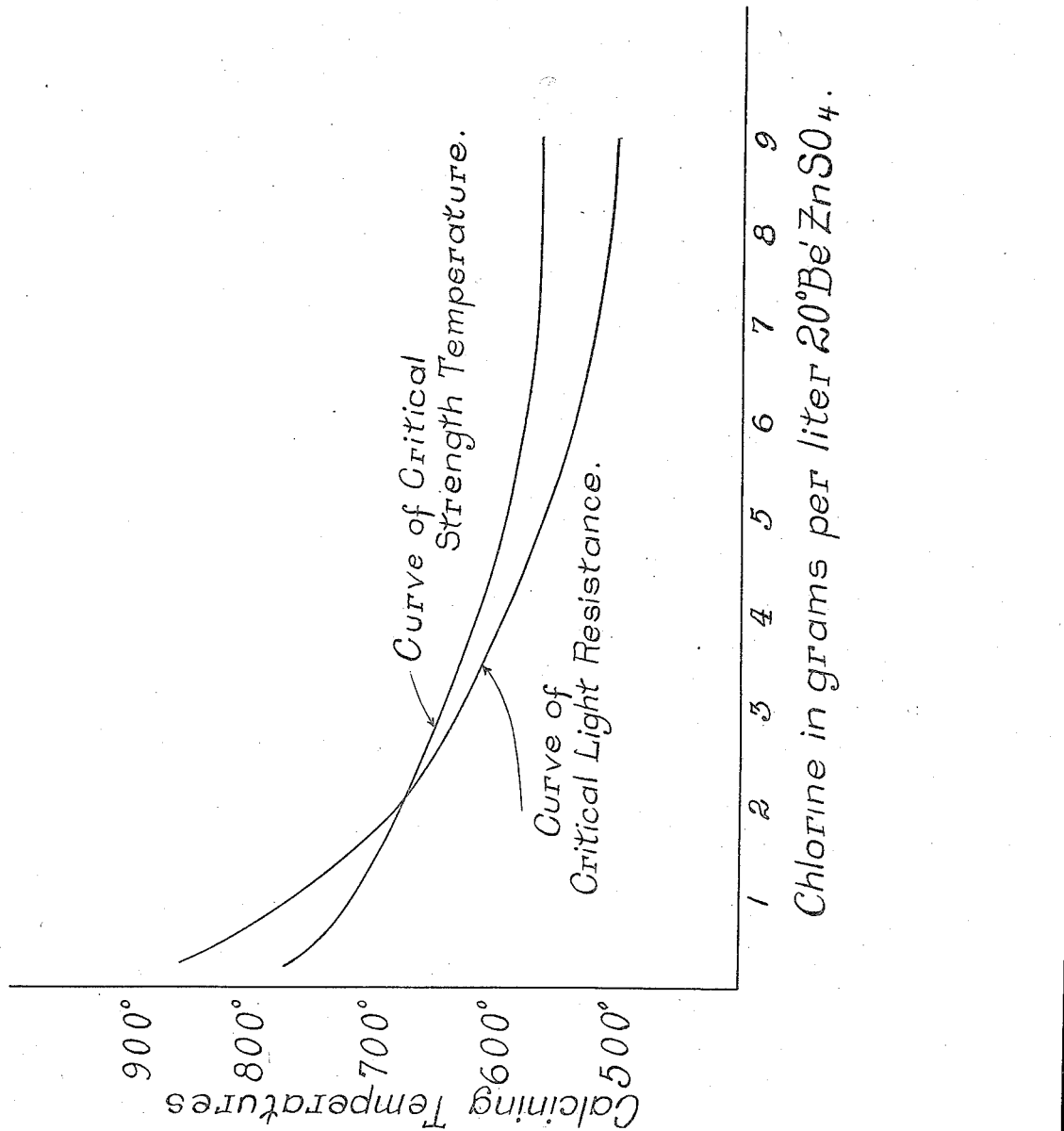

UNITED STATES PATENT OFFICE.

FRANK G. BREYER AND PAUL R. CROLL, OF PALMERTON, AND CLAYTON W. FARBER, OF BOWMANSTOWN, PENNSYLVANIA, ASSIGNORS TO THE NEW JERSEY ZINC COMPANY, OF NEW YORK, N. Y., A CORPORATION OF NEW JERSEY.

MANUFACTURE OF LITHOPONE.

1,411,645.      Specification of Letters Patent.      Patented Apr. 4, 1922.

Application filed October 2, 1919. Serial No. 327,921.

*To all whom it may concern:*

Be it known that we, FRANK G. BREYER and PAUL R. CROLL, residing at Palmerton, in the county of Carbon, State of Pennsylvania, and CLAYTON W. FARBER, residing at Bowmanstown, county of Carbon, State of Pennsylvania, have invented certain new and useful Improvements in the Manufacture of Lithopone; and we do hereby declare the following to be a full, clear, and exact description of the invention, such as will enable others skilled in the art to which it appertains to make and use the same.

This invention relates to the manufacture of lithopone, and has for its object the provision of certain improvements in lithopone manufacture.

Lithopone is composed of barium sulfate and zinc sulfide and is obtained by mixing solutions of barium sulfide and zinc sulfate. The precipitate of barium sulfate and zinc sulfide is washed and dried and is known in the art as crude lithopone. It has a low degree of brightness, is far from perfect white in color, is hard and gritty, possesses low strength or hiding power, and has an extremely low oil absorption. Crude lithopone is, therefore, totally unsuited for paint purposes, but when it is heated, for example, to dull redness, and suddenly cooled, by plunging into cold water, its characteristics are so modified as to adapt it for paint purposes.

A satisfactory pigment for paint purposes should have good body or oil absorbing capacity and high strength or hiding power. Lithopone, in addition to these general prerequisites, should be bright and light-resistant. While crude lithopone is substantially unaffected by sunlight, the calcined or muffled product is generally more or less sensitive to light, as evidenced by a pronounced darkening when exposed to sunlight. This darkening of lithopone is objectionable in most cases, and the improvements in lithopone manufacture contemplated by the present invention are especially designed to overcome this defect as well as to provide a lithopone possessing other superior properties for paint purposes.

As ordinarily manufactured, lithopone is precipitated in the presence of some electrolyte, usually a soluble chloride present in the zinc sulfate solution in an amount in excess of 5 grams of chloride per liter of zinc sulfate solution of 20° Baumé (Bé). Sodium chloride is among the most satisfactory agents for this purpose, both on account of its cheapness and its high dissociation into sodium and chloride ions when dissolved in water. Other soluble chlorides are of course available for the purpose of providing the necessary electrolyte in the precipitating liquors. Frequently one or the other of the precipitating liquors already contains a certain amount of a soluble chloride. Thus, soluble chlorides may be present in the zinc sulfate solution as the result of the purification of this solution from iron, manganese, or other similar impurities, which are frequently removed by the use of bleaching powder, or chlorine in some other appropriate form. Soluble chlorides may likewise be present in the zinc sulfate solution as the result of the preparation of the solution from materials which have been previously given a chloridizing roast.

It has heretofore been recognized in the art that lithopone precipitated from solutions substantially free of chlorine is highly resistant to sunlight. It is a matter of experience, however, that such lithopones, produced by the processes heretofore proposed in which chlorine is substantially absent in the precipitating liquors, are not neutral with respect to oil and varnish vehicles, that is, such lithopones have high oil absorption and marked tendencies to liver and thicken on standing or ageing. It has also been known that lithopone can be made fairly light-resistant by the use of a number of additive agents, added at some point in the process of manufacture or even to the finished dry pigment. The most successful of these additive agents are of a basic nature, and one in particular, magnesium oxid, has been and is today used to a considerable extent. The use of these additive agents, however, is accompanied with the same objectionable effects as mentioned in connection with lithopones precipitated in solutions substantially free of chlorine, in that such additive agents render the lithopone active and increasingly liable to livering and thickening effects. Furthermore, the protective influence of these additive agents against light effects is often lost with time, and for this reason they are generally not dependable.

We have discovered that the important thing is not the entire absence of chlorine in the precipitating liquors but an understanding of the relation that exists between the amount of chlorine present in the liquors during the precipitation of the crude lithopone and the temperature at which the crude lithopone is calcined or muffled, on the one hand, and the strength, light resistance, oil absorption, and color of the calcined or muffled product, on the other hand. Thus, we have discovered that the calcining or muffling temperature, necessary to give the lithopone satisfactory strength, is raised by decreasing the chlorine content of the precipitating liquors. For example, when there is present in the precipitating liquors an amount of chlorine equivalent to 9 grams of chlorine per liter of the zinc sulfate solution employed calculated at 20° Bé., an amount commonly employed in commercial practice, satisfactory strength can be imparted to the lithopone with a calcining or muffling temperature of about 600° C., or slightly less, while a calcining or muffling temperature of between 700° and 800° C. is required to give satisfactory strength to a lithopone when the chlorine content of the liquors from which the lithopone was precipitated is the equivalent of less than 1 gram of chlorine per liter of zinc sulfate solution employed, calculated with respect to a solution of a concentration of 20° Bé. Between the two examples just mentioned, the calcining or muffling temperature necessary to impart to the lithopone the desired strength and color increases as the chlorine content of the precipitating liquors is decreased.

In addition to the critical strength temperature, that is to say, the temperature necessary to give the lithopone the desired strength or hiding power, there is a critical light-resistance temperature. As hereinbefore explained, crude lithopone is practically unaffected by sunlight, but becomes sensitive to light as the result of the calcining or muffling treatment, and by the critical light-resistance temperature, we mean the temperature to which lithopone can be heated without losing its resistance to light beyond a certain desirable limit. As the result of our investigations we have discovered that the critical light-resistance temperature, as well as the critical strength temperature, is raised as the chlorine content of the precipitating liquors is lowered. The rise in critical light resistance temperature being proportionately much greater, however, than the rise in critical strength temperature, we obtain, as the chlorine content goes down, increasingly greater light resistance at the corresponding critical strength temperature. Thus, the critical light-resistance temperature of a lithopone, precipitated in the presence of the equivalent of about 9 grams of chlorine per liter of 20° Bé. zinc sulfate solution, is well below the critical strength temperature (around 600° C.) for this lithopone, and accordingly, when such a lithopone is calcined or muffled at its critical strength temperature it has poor light resistance. When, however, a lithopone precipitated in the presence of the equivalent of less than 1 gram of chlorine per liter of zinc sulfate solution employed calculated at 20° Bé. is calcined or muffled between 700° and 800° C., its critical strength temperature, an excellent light resistance material is obtained.

The accompanying drawing graphically illustrates (for a particular lithopone precipitated in the presence of a soluble chlorid) the aforementioned relationship between the amount of chlorid present in the precipitating liquors during the precipitation of the crude lithopone and the temperatures at which the corresponding precipitates (after appropriate drying) must be calcined in order to develop the desired strength and color, as well as the temperatures above which the corresponding precipitates must not be calcined in order to maintain satisfactory resistance to light for paint purposes. Thus, the curve of critical strength temperature indicates the temperatures at which those lithopones, precipitated from solutions containing varying amounts of a soluble chlorid, must be calcined in order to develop the desired strength, while the curve of critical light resistance indicates the temperatures above which those lithopones, precipitated from solutions containing similarly varying amounts of the soluble chlorid, must not be calcined in order to maintain satisfactory resistance to light for paint purposes. The curves of critical strength temperature and critical light resistance will vary with different electrolytes, and with the varying and different conditions of manufacture encountered in actual practice, and the curves shown in the accompanying drawing are to be taken as merely explanatory of the aforementioned principles of our present invention, and it is to be understood that the invention is not limited to the manufacture of lithopones under the conditions or with any particular electrolyte which will give curves of critical strength temperature and critical light resistance conforming with the curves shown in the drawing.

The color of a lithopone is improved very markedly by higher calcining or muffling temperatures, and consequently tends to improve as the critical strength temperature rises with lithopones precipitated from solutions of lower chlorine content, provided the calcining or muffling is carried out as hereinafter described. The oil absorbing properties of a lithopone at a given calcining or muffling temperature are also dependent upon the chlorine content of the precipitating liquors, the lower the chlorine content of the precipitating liquors the higher is the oil absorption. Thus we have found that the oil absorption of a lithopone gradually increases as the chlorine content of the precipitating liquors is decreased (the lithopone being calcined or muffled at the appropriate critical strength temperature corresponding to the particular chlorine content in hand), until the chlorine content of the precipitating liquors is about the equivalent of 1 gram of chlorine per liter of 20° Bé. zinc sulfate solution, when the oil absorption increases abruptly upon further decrease in the chlorine content.

As the result of our investigation of the effect of the chlorine content of the precipitating liquors upon all the properties of the lithopone, we have determined that a lithopone possessing the optimum properties for paint purposes can be obtained when the chlorine content of the precipitating liquors is less than the equivalent of two grams of chlorine per liter of the zinc sulfate solution employed calculated with respect to a solution having a concentration of 20° Bé., and the crude lithopone calcined or muffled at the appropriate critical strength temperature, of from about 700° C., or slightly less, to 800° C. But in any event, the chlorine content of the precipitating liquors must be appreciable say, for example, in excess of the equivalent of 0.1 gram of chlorine per liter of 20° Bé. zinc sulfate solution. We have secured excellent results when the precipitating liquors have a chlorine content the equivalent of about 1 gram of chlorine per liter of 20° Bé. zinc sulfate solution.

In practicing the invention, for the purpose of producing a lithopone for paint purposes, the solutions of barium sulfide and zinc sulfate having a chlorine content the equivalent of from 0.1 to 2 grams of chlorine per liter of 20° Bé. zinc sulfate solution, are mixed in the usual manner and the precipitate washed and dried. Depending upon the purifying reagents the zinc sulfate solution usually contains more or less chlorine to which amount is added, generally in the form of salt sodium chloride, sufficient further chlorine to bring the total up to .1 to 2 grams per liter calculated as above.

The crude lithopone is then calcined or muffled at a temperature between about 700° C. and 800°C., and is plunged into cold water at the completion of the calcining or muffling operation, as is now customary. The calcined or muffled product is then ground, pressed and disintegrated in accordance with the present customary practice, and there is obtained a white pigment of extremely high quality in strength, resistance to light, oil absorption, and color.

While lithopone precipitated according to the above described process may be calcined or muffled at the appropriate temperatures in any suitable form of apparatus or muffle with resulting improvement in the desired qualities, our preferred practice is completely described in the copending patent application of Frank G. Breyer and James A. Singmaster, Serial No. 342,523, filed December 4, 1919.

Essentially, this practice is to muffle the material at the appropriate temperature in a continuous vertical muffle through which the material is passed by gravity, properly proportioned to secure uniformity of heating, and designed to exclude air or oxidizing gases from the material. Since a relatively small amount of overheated or underheated material will affect the entire product, it is most important, if the optimum qualities are to be obtained, that the muffle be so proportioned that the material treated therein be uniformly heated (both as to temperature and time) and the muffle must, therefore, be specifically designed with this in view.

As hereinbefore mentioned, crude lithopone before calcining or muffling has the requisite light-resisting properties which it is desirable to retain in the finished product. The characteristic feature of the present invention involves the discovery that the finished product can be given the desired strength and the desired color, without sacrificing the light-resisting properties, by employing a soluble chlorid (or other appropriate electrolyte) in the precipitating liquors, and so controlling the amount of electrolyte present in the precipitating liquors that in the calcining or muffling operation the desired strength and color will be obtained, and so that the final product will likewise have an oil-absorbing capacity appropriate to the normal uses of lithopone as a pigment. In accordance with the principles hereinbefore discussed, the amount of chlorid (or other appropriate electrolyte), present in the precipitating liquors, is so controlled that on calcining or muffling the precipitate (after appropriate drying) at a temperature sufficient to develop the desired strength and color, resistance to light is substantially maintained, and the capacity for oil-absorption in the finished product is determined within limits giving a flat paint finish.

While we have hereinbefore particularly described our preferred practice for obtaining a lithopone of superior qualities for paint purposes, it will be understood by those skilled in the art that the discoveries which we have herein explained enable the operator to predetermine the requisite chlorine content of the precipitating liquors and the corresponding critical strength temperature for obtaining a lithopone of any desired properties. Thus, for example, it may be desirable to produce a lithopone having a given oil absorption, in which case the operator would determine from the relation between the oil absorption and chlorine content of the precipitating liquors, as hereinbefore described, the desired chlorine content for producing the given oil absorption, and then, from the relation between chlorine content of the precipitating liquors and the critical strength temperature, he would determine the necessary temperature of muffling. These, and other applications of the invention will be apparent to those skilled in the art from the foregoing description.

We claim:

1. The improvement in the manufacture of lithopone, which comprises precipitating the lithopone by mixing solutions of barium sulfide and zinc sulfate in the presence of an electrolyte, controlling the amount of electrolyte present in the precipitating liquors so that the calcining temperature required to give the lithopone the desired strength is substantially lower than the temperature at which the lithopone loses its resistance to light to an objectionable extent for paint purposes, and calcining the resulting precipitate at a temperature sufficiently high to give the lithopone the desired strength, but not higher than the temperature at which the lithopone loses its resistance to light to an objectionable extent for paint purposes; substantially as described.

2. The improvement in the manufacture of lithopone, which comprises precipitating the lithopone by mixing solutions of barium sulfide and zinc sulfate in the presence of a soluble chloride, controlling the amount of chloride present in the precipitating liquors so that the calcining temperature required to give the lithopone the desired strength is substantially lower than the temperature at which the lithopone loses its resistance to light to an objectionable extent for paint purposes, and calcining the resulting precipitate at a temperature sufficiently high to give the lithopone the desired strength, but not higher than the temperature at which the lithopone loses its resistance to light to an objectionable extent for paint purposes; substantially as described.

3. The improvement in the manufacture of lithopone, which comprises precipitating the lithopone by mixing solutions of barium sulfide and zinc sulfate in the presence of a soluble chloride, the amount of chloride present being not in excess of the equivalent of 2 grams of chlorine per liter of zinc sulfate solution employed calculated with respect to a concentration of 20° Baumé, and calcining the resulting precipitate at the temperature required to give the lithopone the desired strength; substantially as described.

4. The improvement in the manufacture of lithopone, which comprises precipitating the lithopone by mixing solutions of barium sulfide and zinc sulfate in the presence of a soluble chloride, the amount of chloride present being not in excess of the equivalent of 2 grams of chlorine per liter of zinc sulfate solution employed calculated with respect to a concentration of 20° Baumé, and calcining the resulting precipitate at a temperature between 700° and 800° C.; substantially as described.

5. The improvement in the manufacture of lithopone, which comprises mixing a solution of barium sulfide and a solution of zinc sulfate of about 20° Bé. and having an appreciable chlorine content not in excess of 2 grams per liter, and muffling the resulting precipitate at a temperature between 700° and 800° C.; substantially as described.

6. The improvement in the manufacture of lithopone, which comprises mixing a solution of barium sulfide and a solution of zinc sulfate having an appreciable chlorine content not in excess of the equivalent of 2 grams of chlorine per liter calculated with respect to a solution of 20° Bé., and calcining the resulting precipitate at a temperature between 700° and 800° C.; substantially as described.

7. The improvement in the manufacture of lithopone, which comprises precipitating the lithopone by mixing solutions of barium sulfide and zinc sulfate in the presence of a soluble chloride, the amount of chloride present being the equivalent of about 1 gram of chlorine per liter of zinc sulfate solution employed calculated with respect to a concentration of 20° Baumé, and calcining the resulting precipitate at the temperature required to give the lithopone the desired strength; substantially as described.

8. The improvement in the manufacture of lithopone, which comprises precipitating the lithopone by mixing solutions of barium sulfide and zinc sulfate in the presence of a soluble chloride, the amount of chloride present being the equivalent of about 1 gram of chlorine per liter of zinc sulfate solution employed calculated with respect to a concentration of 20° Bé., and calcining the resulting precipitate at a temperature between 700° and 800° C.; substantially as described.

9. The improvement in the manufacture of lithopone, which comprises mixing a solution of barium sulfide and a solution of zinc sulfate containing a soluble chloride of an amount equivalent to about 1 gram of chlorine per liter of zinc sulfate solution calculated with respect to a concentration of 20°

Bé., and calcining the resulting precipitate at a temperature between 700° and 800° C.; substantially as described.

10. The improvement in the manufacture of lithopone, involving the precipitation of the lithopone by mixing solutions of barium sulfide and zinc sulfate in the presence of an electrolyte, which comprises preliminarily determining the temperatures at which lithopone (precipitated from solutions containing varying amounts of electrolyte) must be calcined in order to develop the desired strength and color as well as the temperatures above which lithopone (precipitated from solutions containing similarly varying amounts of electrolyte) must not be calcined in order to maintain satisfactory resistance to light for paint purposes, and then so controlling the amount of electrolyte present in the precipitating liquors that on calcining the precipitate (after appropriate drying) at a temperature sufficient to develop the desired strength and color, resistance to light is substantially maintained; substantially as described.

11. The improvement in the manufacture of lithopone involving the precipitation of the lithopone by mixing solutions of barium sulfide and zinc sulfate in the presence of a soluble chlorid, which comprises preliminarily determining the temperatures at which lithopone (precipitated from solutions containing varying amounts of said soluble chlorid) must be calcined in order to develop the desired strength and color as well as the temperatures above which lithopone (precipitated from solutions containing similarly varying amounts of said soluble chlorid) must not be calcined in order to maintain satisfactory resistance to light for paint purposes, and then so controlling the amount of said soluble chlorid present in the precipitating liquors that on calcining the precipitate (after appropriate drying) at a temperature sufficient to develop the desired strength and color, resistance to light is substantially maintained; substantially as described.

12. The improvement in the manufacture of lithopone involving the precipitation of the lithopone by mixing solutions of barium sulfid and zinc sulfate in the presence of an electrolyte, which comprises preliminarily determining the temperatures at which lithopone (precipitated from solutions containing varying amounts of electrolyte) must be calcined in order to develop the desired strength, color and oil absorption as well as the temperatures above which lithopone (precipitated from solutions containing similarly varying amounts of electrolyte) must not be calcined in order to maintain satisfactory resistance to light for paint purposes, and then controlling the amount of electrolyte present in the precipitating liquors so that on calcining the precipitate (after appropriate drying) at a temperature sufficient to develop the desired strength and color, resistance to light is substantially maintained, and so that the final product will have an oil-absorbing capacity appropriate to the normal uses of lithopone as a paint pigment, substantially as described.

13. The improvement in the manufacture of lithopone involving the precipitation of the lithopone by mixing solutions of barium sulfid and zinc sulfate in the presence of a soluble chlorid, which comprises preliminarily determining the temperatures to which lithopone (precipitated from solutions containing varying amounts of said soluble chlorid) must be calcined in order to develop the desired strength, color and oil absorption as well as the temperatures above which lithopone (precipitated from solutions containing similarly varying amounts of said soluble chlorid) must not be calcined in order to maintain satisfactory resistance to light for paint purposes, and then controlling the amount of said soluble chlorid present in the precipitating liquors so that on calcining the precipitate (after appropriate drying) at a temperature sufficient to develop the desired strength and color, resistance to light is substantially maintained, and so that the final product will have an oil-absorbing capacity appropriate to the normal uses of lithopone as a paint pigment; substantially as described.

In testimony whereof, we affix our signatures.

FRANK G. BREYER.
PAUL R. CROLL.
CLAYTON W. FARBER.

Certificate of Correction.

It is hereby certified that in Letters Patent No. 1,411,645, granted April 4, 1922, upon the application of Frank G. Breyer and Paul R. Croll, of Palmerton, and Clayton W. Farber, of Bowmanstown, Pennsylvania, for an improvement in "The Manufacture of Lithopone," errors appear in the printed specification requiring correction as follows: Page 1, lines 55 and 60, for the word "chloride" read *chlorine;* page 2, line 81, for the word "resistance" read *resistant;* and that the said Letters Patent should be read with these corrections therein that the same may conform to the record of the case in the Patent Office.

Signed and sealed this 30th day of May, A. D., 1922.

[SEAL.]

KARL FENNING,
*Acting Commissioner of Patents.*